Figure 1:
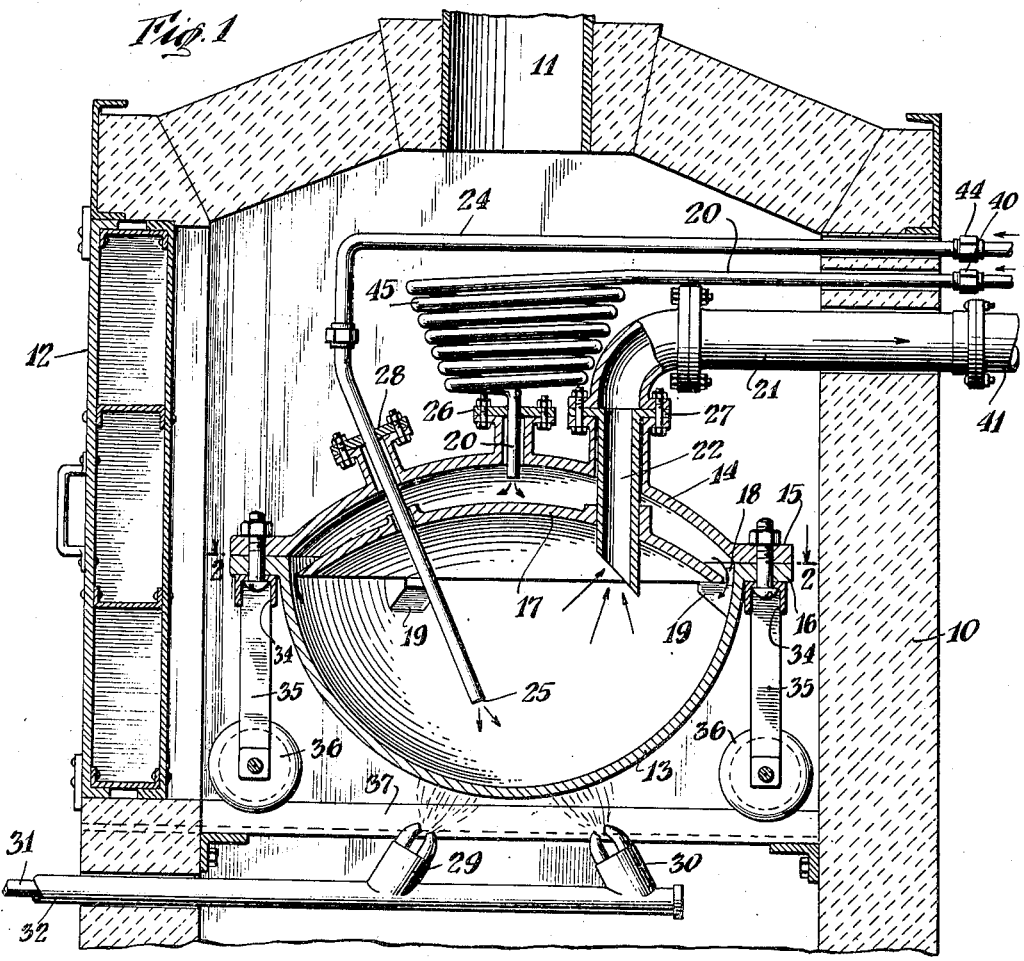

April 11, 1939. G. W. BURKE 2,153,953

VAPORIZATION OF PHOSPHORUS

Filed Aug. 25, 1936

INVENTOR
*George W. Burke*
BY
*Cooper, Kerr & Dunham*
ATTORNEYS

Patented Apr. 11, 1939

2,153,953

UNITED STATES PATENT OFFICE 2,153,953

VAPORIZATION OF PHOSPHORUS

George W. Burke, Westfield, N. J., assignor to The American Agricultural Chemical Company, Newark, N. J., a corporation of Delaware Application August 25, 1936, Serial No. 97,758

6 Claims. (Cl. 23—223)

This invention relates to the vaporization of phosphorus, and particularly to the production of phosphorus vapor such as that which may be employed, for example, in the manufacture of phosphoric anhydride and acid, and phosphates, from elemental phosphorus. In such procedures for making phosphorus compounds wherein the phosphorus is first reduced to its elemental form, particularly satisfactory ultimate products are obtained—as well as a thorough conversion of phosphorus to its oxide, e. g., $P_2O_5$, and a ready recovery of that material,—where the phosphorus is burned in vapor form. Considerable trouble or inefficiency has heretofore been encountered, however, in boiling or vaporizing phosphorus for this and like purposes. It is generally difficult to attain uniform heating of large bodies of phosphorus, and I have particularly found that a considerable quantity of the element is often converted to red or amorphous phosphorus. Tests have shown that not only does such conversion use up heat for the sake of the conversion alone, and thus to no avail, but the resulting red phosphorus tends to choke the furnace or retort in which the material is charged, to adhere to the walls of the furnace, and generally to insulate the remaining phosphorus from the source of heat. In consequence, the attainment of satisfactory vaporization, and particularly of a uniform flow of phosphorus vapor, is seriously impeded, and continuous economical operation over any appreciable period of time and without cooling down and cleaning the furnace is practically impossible.

The present invention accordingly has for a chief object the provision of procedure and apparatus for economically and rapidly vaporizing phosphorus and particularly for obviating or reducing one or more of the difficulties heretofore attendant upon the vaporization of phophorus. Other objects of the invention include provision for the vaporization of phosphorus, without appreciable formation of red phosphorus, and in such manner as to provide a uniform flow of vapor with a minimum expenditure of heat. Still other objects are to provide procedure for vaporizing phosphorus which may be carried on continuously and without loss of phosphorus or waste of heat by reason of the formation or accumulation of red phosphorus, and also to provide relatively simple and inexpensive apparatus which can be employed for the vaporization of phosphorus in an efficient manner and in such way as to attain one or more of the objects already stated. Further objects and advantages will be apparent from the following description of the invention, particularly in reference to certain presently preferred embodiments thereof.

Figure 2:
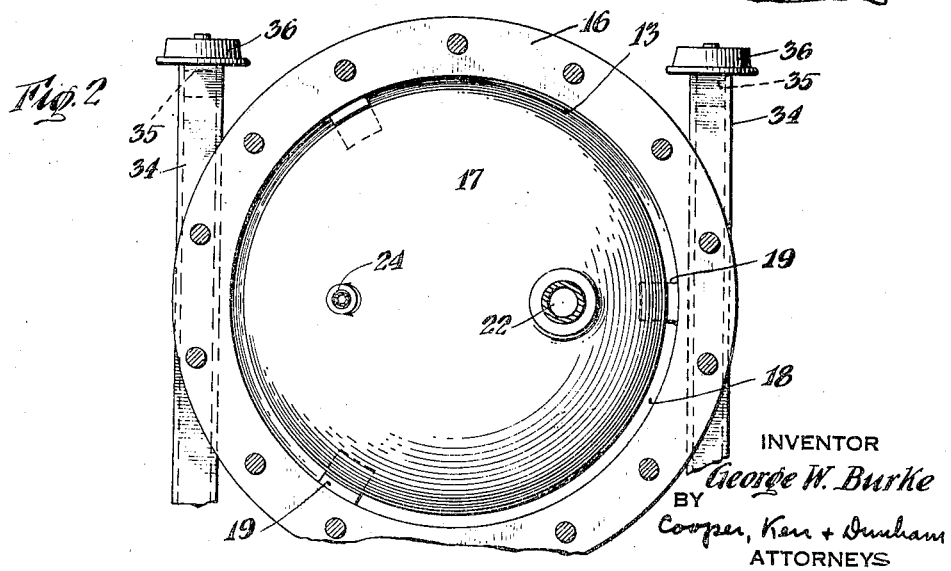

In the accompanying drawing, which shows an advantageous form of the apparatus embodying the invention:

Figure 1 is a vertical section of a furnace embodying and including the apparatus for vaporizing phosphorus and Fig. 2 is a horizontal section on line 2—2 of the phosphorus vaporizing chamber shown in Fig. 1, the phosphorus distributor being shown in plan view.

Referring to the drawing, the apparatus there shown includes a furnace 10, conveniently constructed of the usual fire brick, provided with a flue or stack 11 for the escape of burned gases, and having a door or like closure 12 in one of its side walls. To be heated in the furnace there is disposed therein the vaporizing chamber, which comprises a concave lower portion 13, and a cover member 14, which is conveniently of dome-shaped configuration and which is provided at its periphery with a flange 15 secured by bolts to a corresponding flange 16 on the lower portion 13, so as to provide, with the latter, a gas-tight closed chamber.

Within this chamber and near its upper portion, a distributor dome 17 is provided, having an upwardly convex upper surface, as shown. The diameter of the distributor dome 17 is slightly less than the interior diameter of the chamber at the point where the dome is mounted therein, so as to provide a circular slot or opening which is intermediate the outer edge of the dome 17 and the inner wall of the chamber section 13, and which is conveniently interrupted only by the lugs 19 that serve to support the dome 17 within the chamber. Extending downwardly through the upper chamber wall 14 is a pipe 20, through which melted phosporus can be introduced to the interior of the vaporizer, flowing from the lower end of the pipe 20 on to the highest point of the convex upper surface of the the distributor 17,—the latter being conveniently mounted in a position relatively close to the upper wall of the chamber and the lower end of pipe 20, as shown. Another pipe 21, for removing phosphorus vapor from the apparatus, has a lower portion 22 which extends through the upper wall 14 and the distributor plate 17 to a point in the lower part of the chamber, just below the distributor plate. The lower end of pipe 22 may be conveniently provided with a suitable opening configuration, such as the diagonal opening shown, for efficient collection of the vapor which is evolved in the lower part of the chamber.

A further pipe 24, likewise extends downwardly through the upper wall 14 and the dome 17 of the chamber, and preferably to a point 25 relatively near the bottom of the lower chamber wall 13; this pipe 24 being used for the introduction of superheated steam into the vaporizer. It will be appreciated that pipes 20, 21 and 24 extend out through the furnace wall, for example as shown, so that suitable supply of melted phosphorus and of steam may be respectively delivered to pipes 20 and 24 and the vapor from pipe 21 can be delivered to a suitable combustion chamber or other apparatus for its utilization.

It will be appreciated that pipes 20, 21—22, and 24 are introduced through the upper wall 14 of the vaporizer by means of suitable welded and bolted connections 26, 27 and 28, respectively, so that there will be no transfer of gas or vapors between the interior of the vaporizing chamber and the larger interior of the surrounding furnace.

In the lower part of the furnace, and preferably immediately below or surrounding the bottom of the vaporizer, a source of heat is provided, such as the oil burners 29, 30, arranged to direct their flames against the bottom wall 13 of the chamber. Oil and air under the requisite pressure can be conveniently supplied to these burners (which may, themselves, be of any standard type) through pipes 31 and 32, respectively, from the usual apparatus therefor. It will be understood that other sources of heat may be readily employed and that, if desired, a group of oil burning nozzles, for example of the type shown, may be arranged in a circular row around the lower part of the chamber portion 13.

In order to remove the vaporizer for adjustment, cleaning or repair, the pipes 20, 21 and 24 may be provided with readily separable connectors 40, 41 and 44, respectively, as shown, and the vaporizing chamber, itself, is mounted on supporting cross-members 34, 34, which, together with uprights 35 and such bracing parts as may be needed, provide a truck arrangement having supporting wheels 36. A rail 37 may be provided at each side of the lower part of the furnace, to support the corresponding wheels 36 on each side of the truck, the arrangement being such that when the separable connectors 40, 41 and 44 outside the furnace are taken apart, and the door 12 opened, the entire vaporizer, and the attached portions of pipes 20, 21 and 24 (arranged to slide in the apertures in the furnace wall through which they normally extend), may be readily rolled from the furnace through the doorway.

The procedure of the invention may be conveniently understood by the following description of a preferred manner of effecting continuous production of phosphorus vapor with the apparatus just described:

Assuming that the burners 29, 30 have been put in operation to heat the lower part of the vaporization chamber to a temperature which is preferably somewhat higher than the temperature at which ordinary phosphorus boils or vaporizes under atmospheric pressure, melted and preheated phosphorus is introduced from the line 20. The temperature to which the phosphorus is preheated, as by coil 45 in line 20, disposed above the vaporizer in the furnace, is preferably somewhat below that at which ordinary or yellow phosphorus might be converted, over a period of time, into red or amorphous phosphorus (viz. 240°–250°), and may conveniently be, for example, about 150° C. Ejected from the lower end of pipe 20, the molten phosphorus drops upon the top of the distributor dome 17 and flows by gravity down over the surface of the latter and through the peripheral apertures 18 into the lower part of the vaporizing chamber where it tends to flow down the inwardly-sloping walls 13 to the bottom. Thus arriving at the directly heated zone of the chamber, the phosphorus is rapidly vaporized, and passes out through the conduit 21. In other words, by means such as the arrangement of the distributor dome 17 and the construction of the lower part of the vaporizing chamber 13, the phosphorus is actually maintained in a flowing melted condition until it vaporizes. It is spread out by the distributor 17 into a relatively thin layer of flowing material, and thus drops more or less uniformly in a thin curtain or stream of molten phosphorus, down through the apertures or slots at the periphery of the distributor, and into the lower part of the chamber. There, by virtue of the previously described distributon of the molten phosphorus into a relatively thin layer, the molten material is correspondingly distributed around the interior surface of the walls 13, so that there is no opportunity for the molten phosphorus to become stationary or to collect in a large body or pool, short of the very bottom of the chamber portion 13. That, however, is the hottest zone of the vaporizer, and the flow of phosphorus thereto having been distributed in the manner stated, the effect is to vaporize the molten phosphorus very rapidly and usually before any of it can reach the bottom of the chamber at all.

In order to facilitate this action, superheated steam, advantageously heated to a temperature of about 350° C., is forced through the line 24 and directed thereby out of the opening 25 toward the lowermost part of the vaporizing chamber. The superheated steam not only furnishes additional heat on the upper surface of such molten phosphorus as may reach the bottom part of the chamber (or elsewhere, since the steam naturally blows about throughout the interior of the vaporizer), but provides an effective way of assisting the displacement and removal of the phosphorus vapor from the chamber.

It may be further noted that the superheated steam is of further special utility in that it naturally passes out with the vaporized phosphorus, and if present in sufficient quantity may provide the necessary water for the immediate conversion into phosphoric acid, of the oxide which results from subsequent burning of the phosphorus vapor. It will be understood that in many cases, including those where the production of a water-free phosphorus vapor is desired, the introduction of superheated steam or the like into the vaporizing chamber may be dispensed with, or may be replaced by other heated gas,— such as nitrogen or carbon monoxide which are inert to phosphorus at the temperatures here stated. On the other hand, in some instances, the heated steam or gas may itself provide sufficient heat for the described vaporizing action, without other heating means.

It may now be explained that with the foregoing procedure, whereby the phosphorus is distributed in a relatively thin molten layer or steam for rapid heating, and at least for the most part maintained in actual flow until vaporized, there is no opportunity for the accumulation of pools or large slow moving bodies of molten phosphorus wherein the formation of red or amorphous phosphorus might occur,—even though the pressure in the chamber may build up in such way as to accelerate the normal tendency of moderately heated yellow phosphorus to turn into the amorphous variety over a period of time. Preferably, however, the phosphorus output pipe is of relatively large diameter, so as to prevent the formation, within the vaporizing chamber, of pressure substantially higher than that necessary to carry the vapor off. In consequence, continuous operation is economically obtained, and a continuous and uniform stream of phosphorus vapor results. The preheated melted phosphorus is continuously introduced through the pipe 20, continuously flows down over the distributor, and along the interior of the portion 13, and with the aid, if desired, of a correspondingly continuous influx of superheated steam, is rapidly and continuously converted into the desired vapor. In general, and to good advantage the vaporization occurs progressively from the distributed stream of molten phosphorus, as the latter flows down the inside surface of the chamber portion 13,—which may be progressively hotter toward its bottom part.

It will now be appreciated that the heating arrangement need not be such as to heat the distributor plate 17 to the vaporizing temperature, since the initial head of the molten phosphorus and the action of gravity will keep the molten material flowing down over the distributor, so as to avoid accumulation for possible conversion into red phosphorus; in fact, the flowing molten phosphorus itself, preheated to an appropriately relatively low temperature, may in many cases serve to keep the surface of the distributor below any temperature at which conversion to red phosphorus ordinarily occurs. At the same time, there is likewise no need, even at the bottom of the vaporizing chamber, for the development of sufficient heat to vaporize red phosphorus (which is understood to require a temperature of about 450° C. or more for vaporization); a temperature of about 300° C. is sufficient in most cases. Moreover, with such relatively low heating temperatures, not only is there is great economy of heat, but wear and tear on the apparatus are further obviated.

Although apparatus embodied in other suitable forms and materials may be used, notably good results, including an economical, rapid and continuous production of a uniform flow of phosphorus vapor, without formation of red phosphorus, can be obtained with a vaporizing chamber like that shown in the drawing and proportioned and constructed as follows: With the interior surface of the lower member 13 comprising a hemisphere having a spherical radius of 17¼ inches: the interior surface of the upper member 14 is likewise of spherical configuration, being a portion of a sphere having its center at about the lowermost point of the interior surface of member 13 and having a radius of approximately 2 feet; the distributor 17 comprises a shell of like spherical configuration, being a portion of a sphere having its center about 5 inches below the bottom of the member 13 and having inside and outside radii of 2 feet 2 inches and 2 feet 2¾ inches respectively; the diameter of the periphery of the distributor 17 is about 32 inches so as to afford a clearance of about an inch in width, intermediate the distributor and the upper inside surface of the member 13; and the interior diameter of each of pipes 20 and 24 is ¾ inch, and that of pipe 22 is 2¼ inches. The vaporizing chamber, particularly members 13, 14 and 17, is conveniently made of cast iron, which is economical and inert to the action of phosphorus at the temperatures employed, and which provides efficient conduction of heat to the interior of the chamber.

It is to be understood that the invention is not limited to the apparatus herein specifically illustrated and described, and that the methods may be performed in other ways and the apparatus embodied in other forms or for other purposes, without departure from the spirit of the invention, as defined in the following claims.

I claim:

1. A method of vaporizing phosphorus, comprising continuously flowing a thin layer of molten phosphorus on a heated surface in a vaporizing chamber, vaporizing said phosphorus from said flowing layer in a non-oxidizing atmosphere at a rate sufficient to prevent accumulation of phosphorus as a pool in said vessel, and removing the phosphorus vapors.

2. The method of claim 1, in which the vaporizing step includes directing a flow of superheated steam to the layer of molten phosphorus to facilitate the production and removal of phosphorus vapor.

3. A method of vaporizing phosphorus comprising establishing a continuously flowing thin layer of molten phosphorus in a vaporizing chamber, causing said phosphorus to be vaporized from said flowing layer by heat, without igniting the phosphorus vapors in said chamber, and before occurrence of any substantial accumulation of said molten phosphorus into a pool and removing the resulting vapors from the chamber.

4. A method of vaporizing phosphorus, comprising spreading out molten phosphorus into a substantially continuously moving thin layer in a vaporizing zone, applying vaporizing heat to said flowing molten phosphorus while preventing combustion of the resulting vapors in said zone, and preventing accumulation of any substantial pool of the molten phosphorus to which vaporizing heat is being applied, by maintaining said phosphorus in a distributed flowing condition to provide a large surface area per unit volume, for rapid vaporization.

5. The method of claim 4, in which the heat-applying step includes directing a flow of heated non-phosphorus-burning gas to the distributed molten phosphorus throughout said vaporizing process.

6. A method of vaporizing phosphorus, comprising establishing a continuously flowing thin layer of molten yellow phosphorus in a vaporizing chamber, and causing said phosphorus to be vaporized from said flowing layer by heat, without igniting the said phosphorus vapors in said chamber, and before occurrence of any substantial accumulation of said molten phosphorus into a pool, and leading away the vaporized phosphorus from said vaporizing chamber, to a place of utilization thereof before any substantial amount of said yellow phosphorus is converted into red phosphorus.

GEORGE W. BURKE.